Figure 5:
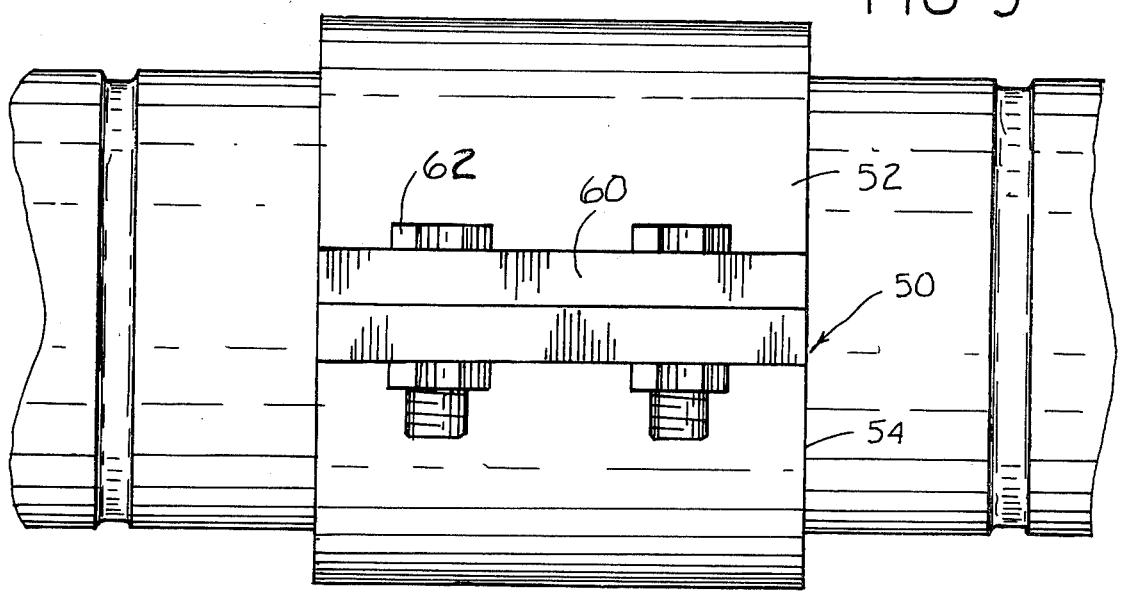

United States Patent [19]

Campbell

[11] 4,310,184
[45] Jan. 12, 1982

[54] POLYOLEFIN PIPE CONNECTOR SLEEVE

[75] Inventor: Steve Campbell, Manchester, Mo.

[73] Assignee: Pipe Systems, Incorporated, Fenton, Mo.

[21] Appl. No.: 144,668

[22] Filed: Apr. 28, 1980

[51] Int. Cl.³ .................. F16L 33/00; F16L 21/06
[52] U.S. Cl. .................................. 285/238; 29/525; 138/109; 285/373; 285/382; 285/423
[58] Field of Search ............ 285/238, 112, 373, 174, 285/382, 419, 423, 414, 330, DIG. 22; 29/525, 451; 138/109

[56] References Cited

U.S. PATENT DOCUMENTS

| | | | |
|---|---|---|---|
| 1,579,474 | 4/1926 | Dempsey et al. | 285/238 X |
| 2,416,964 | 3/1947 | Stull | 285/174 X |
| 3,753,575 | 8/1973 | Tracy | 285/423 |
| 4,039,210 | 8/1977 | Wood et al. | 285/112 |
| 4,126,338 | 11/1978 | Coel | 285/423 X |

FOREIGN PATENT DOCUMENTS

| | | | |
|---|---|---|---|
| 2812884 | 3/1977 | Fed. Rep. of Germany | 285/330 |
| 107946 | 3/1964 | Netherlands | 285/238 |
| 429332 | 7/1967 | Switzerland | 285/238 |
| 858368 | 1/1961 | United Kingdom | 285/112 |

*Primary Examiner*—Dave W. Arola
*Attorney, Agent, or Firm*—Glenn K. Robbins

[57] ABSTRACT

A connector sleeve for polyolefin pipe ends for connecting butted pipe ends by a coupling. The connector sleeve is metallic and has a pair of internal circumferential ribs mated in external grooves of the pipe end which is press-fitted within the sleeve in sealing relation. The connector sleeve has a pair of external grooves registering with the ribs formed by a pressing or rolling operation. Butted pipe ends with their fitted connector sleeves are connected by a coupling engaging the connector sleeves. The connector sleeve and pipe end have registering bevelled ends and in the fitting operation the sleeve and pipe end are axially aligned and forcefully engaged whereby the bevelled end of the connector sleeve causes the pipe end to be internally deflected and compressed in mating engagement with said connector sleeve.

8 Claims, 5 Drawing Figures

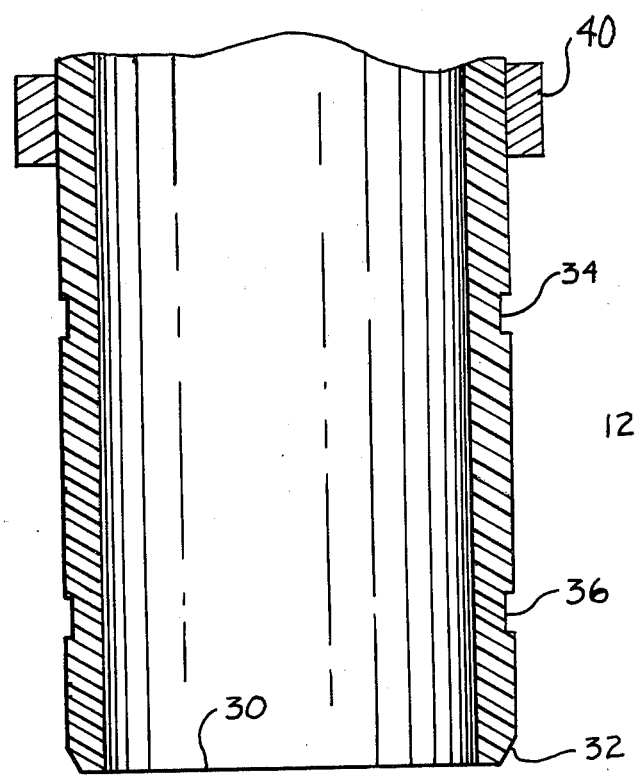
FIG 2
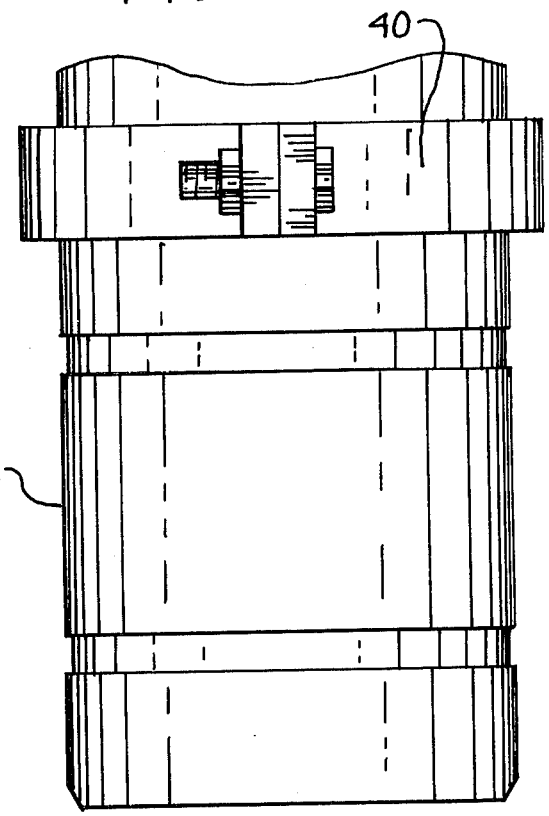
FIG 1
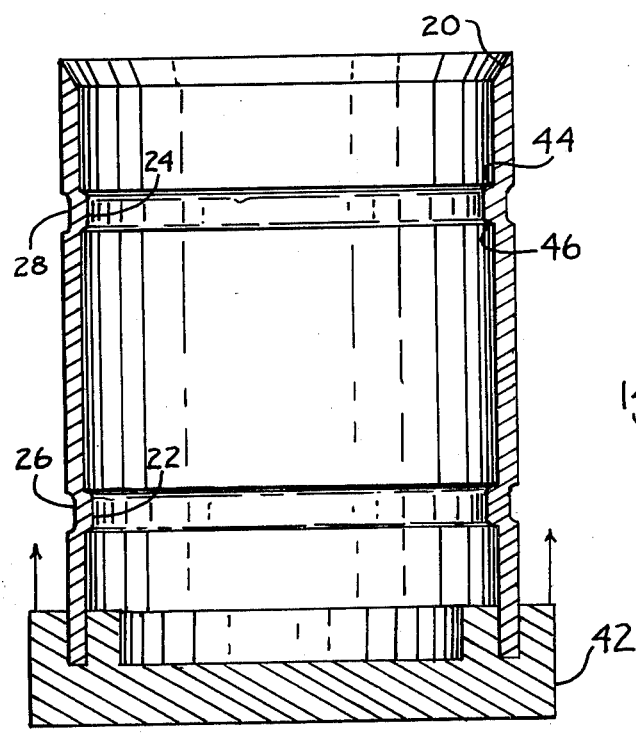
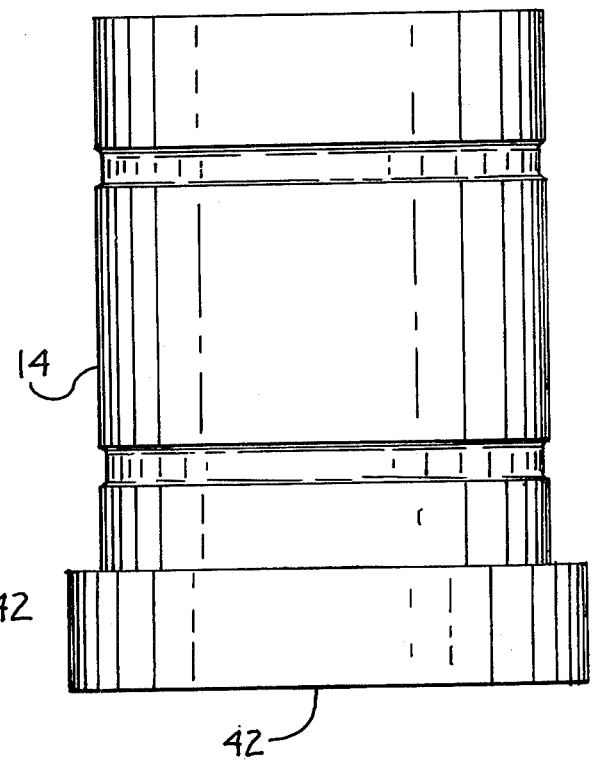

POLYOLEFIN PIPE CONNECTOR SLEEVE

BACKGROUND OF THE INVENTION

In the past various types of plastic polyolefin piping has been widely used in a wide range of industrial applications. Such polyolefin pipe, such as polyethylene, polypropylene, polybutylene, polyvinyldenefluoride and the like, has conventionally been coupled together to join pieces of said pipe at their ends by a clamp type coupling having a pair of internal circumferential ribs. One of said ribs engages a circumferential external groove in one of the butted pipe ends while the other rib engages a like groove in the end of the other butted pipe end to form a seal.

While such coupled pipe ends have largely been used in industry for transport of various fluids under pressure a problem has existed from time to time in leakage of the fluid at the coupling. Such leakage in the field has caused a considerable problem in damage caused by leaking fluids and the time and labor involved in maintainance and repair.

Another type of conventional prior art connection of butted ends has been by fusion welding of the butted ends. This necessitates special electrically and gasoline powered fusion welding machines. In the field this is expensive, time consuming, cumbersome and quite often impractical.

SUMMARY OF THE INVENTION

By means of this invention there has been provided a metallic connector sleeve which is specially adapted to be press-fitted over the end of the polyolefin pipe. The use of the connector sleeve takes into effect the compressibility or elastic deformability of the polyolefin which may be termed a property of plastic memory. The polyolefins contemplated in this invention are such that have this property as distinguished from other rigid plastics that are not deformable or elastically compressible.

The connector sleeve is of a metallic construction and is of a generally open-ended tube-like construction that is adapted by the method of fitting the sleeve over the pipe end to be press-fitted over the pipe end and then received by a conventional polyolefin pipe coupling device.

The connector sleeve is provided with a pair of axially spaced interior circumferential ribs that are formed by a rolling or pressing operation on the exterior of the sleeve that in the aforementioned operation also forms exterior circumferential grooves in the sleeve. The interior ribs are provided to engage in mating relation a pair of exterior grooves that are formed on the exterior of the pipe end. This double engagement form a double seal tending to equalize or minimize pressure loss of fluid from the interior of the couple pipe ends.

The pipe ends fitted with the fitted connector sleeves are coupled when butted together in the same conventional matter as in the past using conventional couplings which engage the end most grooves in the butted connector sleeves.

Both the connector sleeve and the polyolefin pipe end are connected with bevelled ends which facilitate the method of press-fitting the pipe end within the connector sleeve. The bevelled ends are employed as the pipe end and connector sleeve are forcefully moved together by any type of conventional ram and vise or clamp arrangement. This operation causes the pipe end to deflect inwardly and be compressed within the connector sleeve. This relationship is effected by an internal bevelling or chamferring of the connector sleeve and an external bevelling of the pipe. By providing a connector sleeve having an external diameter substantially the same as the external diameter of the pipe this deforming or compressibility of the pipe is effected while at the same time the same size of coupling can be used as previously employed. This simplifies handling, stockpiling and maintainance in the field.

The above features are object of this invention. Further objects will appear in the detailed description which follows and will otherwise be apparent to those skilled in the art.

For the purpose of illustration of this invention a preferred embodiment is shown in the accompanying drawings. It is to be understood that the drawings are for purpose of example and that the invention is not limited thereto.

IN THE DRAWINGS

Figure 4:
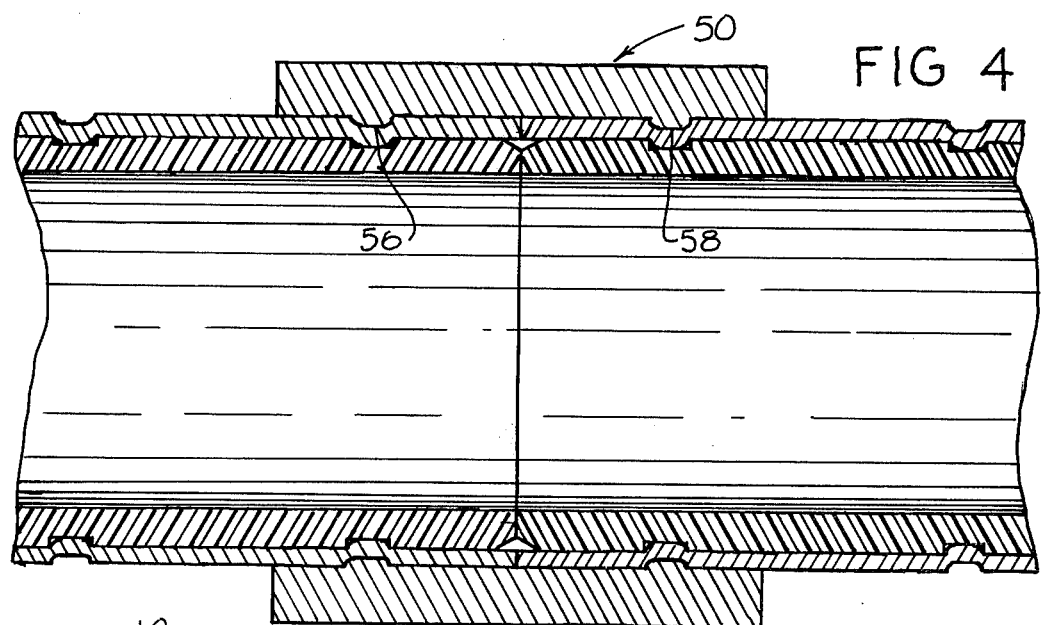
Figure 3:
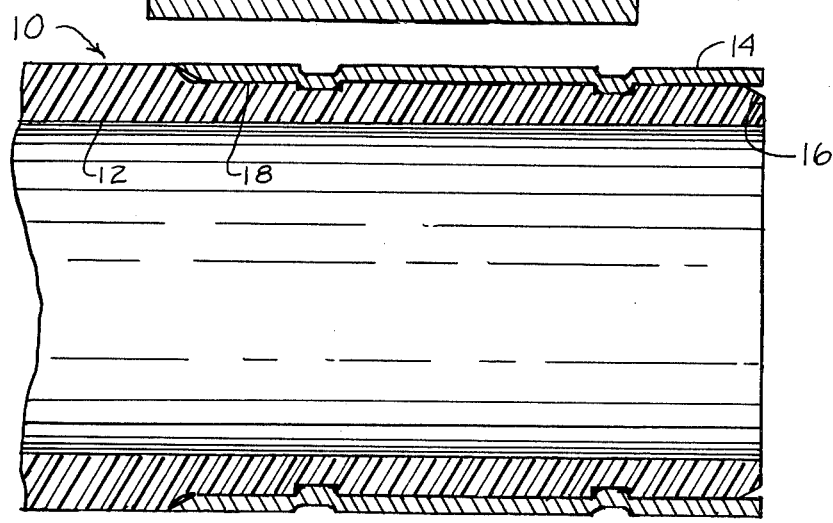

FIG. 1, is a top plan view of the pipe and connector sleeve prior to being fitted together, FIG. 2, is a view similar to FIG. 1, in axial section, FIG. 3, is a view in axial section showing the interfitted connector sleeve and pipe, FIG. 4, is a view in axial section showing a pair of butted pipe ends with connector sleeves joined by a coupling, and FIG. 5, is a top plan view showing the butted pipe ends with connector sleeves joined by the coupling.

DESCRIPTION OF THE INVENTION

The connector sleeve device of this invention is generally indicated by the reference numeral 10 in FIG. 3. It is comprised of a specially formed polyolefin pipe end 12 and a specially formed connector sleeve 14.

The polyolefin pipe is constructed of a polyolefin such as polyethylene, polypropylene, polybutylene, polyvinylidenefluoride and the like which are elastically deformable or compressible and have what may be termed a plastic memory that makes possible the press-fit construction and method employed in this invention.

The connector sleeve 14 as best shown in FIGS. 1, 2 and 3 is made of a metallic construction of conventional metals such as steel and other alloys. The sleeve as best shown in FIG. 2 is of a tube-like construction having open ends 16 and 18. The open end 18 is formed with an internal bevelled or chamferred edge 20 which facilitates the press-fitting operation as will appear more fully hereinbelow.

The connector sleeve is further provided with a pair of circumferentially extending axially spaced interior ribs 22 and 24. These ribs are in registry with a pair of exterior grooves 26 and 28. The rib and groove construction is effected by an external rolling or pressing operation which simultaneously forms the grooves and ribs and provides a significant and dual purpose in construction and economy.

The pipe end 12, as best shown in FIGS. 1, 2 and 3, has an open end 30 which is provided with an external bevelled or chamferred edge 32. The bevelled edges of the connector sleeve and the pipe end before being press-fitted together as shown in FIGS. 1 and 2 are in axial registry when the pipe end and connector sleeve are aligned in order to provide for interior deflection and compression of the pipe end when the two are forcefully moved together in the forming operation as will be more fully described.

The pipe end 12 is further provided with a pair of circumferential exterior axially spaced grooves 34 and 36. These grooves are formed by a machining or cutting operation. The grooves 34 and 36 are spaced apart the same distance as the spacing between the ribs of the connector sleeve to provide for registry and interfitting of the pipe end into the connector sleeve. Similarly the grooves and ribs are situated at the same distance from the respective ends of the pipe end and the sleeve.

The exterior diameter dimensioning of the connector sleeve and the pipe end is substantially identical. This feature not only provides that the pipe end when press-fitted within the connector sleeve is compressed but also ensures that the fitted connector sleeve can be used with conventional coupling for the same size and specification of pipes conventionally used with such couplings and obviate the necessity of special adaptors.

METHOD OF FORMATION

The formation of the fitted connector device 10 of this invention is best understood by referring to FIGS. 1, 2 and 3. In the formation the pipe end 12 is restrained or clamped in a clamp or vise 40 which is of conventional structure and, per se, forms no part of this invention. The connector sleeve 14 is supported by a conventional hydraulic ram or the like generally shown at 42 and which, per se, forms no part of this invention.

With the pipe end and connector sleeve positioned in alignment, the connector sleeve is forcibly moved under pressure into engagement with the pipe end. As the bevelled end 20 of the connector sleeve engages the bevelled end 32 of the pipe end, the latter is caused to deflect inwardly and be compressed to fit within the connector sleeve. The connector sleeve is then moved to the point where the internal ribs engage the external grooves of the pipe end to provide the press-fitted relation shown in FIG. 3. Due to the deformability of the polyolefin pipe construction the rib 24 is moved into and out of engagement with groove 36 without damage to the pipe end until the final registry is obtained. This operation is further facilitated by the bevelled sides 44 and 46 of the ribs which is effected in the rolling or pressing construction in the formation of the groove and rib construction of the connector sleeve.

After the aforementioned construction the connector sleeve device is ready for use with conventional couplings.

USE

The connector sleeve device 10 of this invention is shown in use in FIGS. 4 and 5. This use is shown with a conventional coupling 50.

The coupling 50 for purpose of example may be a Victaulic coupling, manufactured by Victaulic Company of America, of South Plainfield, New Jersey. The coupling is constructed of a pair of semi-circular housing members 52 and 54 provided with internal ribs 56 and 58. Each of the housing members are provided with flanges 60 and tightening bolts 62.

The coupling operation is effected in a conventional matter by butting the opposed connector devices together as shown in FIG. 4. The coupling housing members 52 and 54 are then fitted over the connector sleeve with the internal ribs 56 and 58 fitted into the end most grooves 26 of the butted connector sleeves. The housing members are then drawn tight in a conventional manner by the tightening bolts 62. It will be understood that the usual gaskets may be employed between the ribs of the coupling and the grooves of the connector sleeve as in conventional practice. The coupling is then completed.

Various changes and modifications may be made within this invention as will be apparent to those skilled in the art. Such changes and modifications are within the scope and teaching of this invention as defined in the claims appended thereto.

What is claimed is:

1. A connector sleeve device for connecting butted polyolefin pipe ends together by a coupling, said device comprising a tube-like metallic connector sleeve having a plurality of circumferential axially spaced internal ribs and external grooves in registry with one another, a polyolefin pipe end having a plurality of circumferential grooves, said metallic sleeve being press fitted over said pipe end with said ribs being fitted within said pipe grooves in mating relation and outer ends of said sleeve and pipe end being in registry with one another, said pipe end and connector sleeve being coupled to a like butted pipe end and connector sleeve by a sleeve like coupling having internal circumferential rib means engageable with the end most grooves in said butted connector sleeves and having an interior circumferential surface engageable in mating relation with the entire exterior circumferential surfaces of said metallic sleeves at the butted end portions thereof between said end most grooves.

2. The sleeve device of claim 1, in which the connector sleeve ribs and grooves are formed by a pressing or rolling circumferential operation on the exterior of said sleeve.

3. The sleeve device of claim 1, in which the external diameter of said connector sleeve is substantially the same as that of the external diameter of said pipe end adjacent the fitted connector sleeve.

4. The sleeve device of claim 3, in which the original external diameter of the pipe end fitted within said sleeve is substantially the same as the external diameter of said connector sleeve.

5. The sleeve device of claim 3, in which said connector sleeve has an internally bevelled end and said pipe end has an externally bevelled end, said bevelled end of said pipe prior to being press-fitted within said connector sleeve being in diametrical registry with said bevelled end of said connector sleeve.

6. The sleeve device of claim 4, in which said connector sleeve has a relatively thinner wall than said pipe end and said pipe end is deformable to an extent that it may be mechanically press-fitted in a compressed relation within said connector sleeve.

7. The sleeve device of claim 1, in which said connector sleeve has an internally bevelled end and said pipe end has an externally bevelled free end opposed to the aforementioned bevelled end of said connector sleeve, said bevelled end of said pipe prior to being press-fitted within said connector sleeve being in diametrical registry with said bevelled end of said connector sleeve.

8. The sleeve device of claim 1, in which said coupling has a first internal rib axially spaced from a second internal rib, said ribs being engageable in clampled relation within an end most groove within said butted connector sleeves with said internal axially spaced ribs of each of said connector sleeves forming a pressure seal by engagement with said external axially spaced grooves of each of said pipe ends.

* * * * *